(12) United States Patent
Kim

(10) Patent No.: US 11,525,807 B2
(45) Date of Patent: Dec. 13, 2022

(54) TRANSDUCER ARRAY

(71) Applicant: Nokia Technologies Oy, Espoo (FI)

(72) Inventor: John Kim, Bridgewater, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/320,356

(22) Filed: May 14, 2021

(65) Prior Publication Data
US 2021/0364470 A1 Nov. 25, 2021

(30) Foreign Application Priority Data

May 21, 2020 (EP) .................................... 20175914

(51) Int. Cl.
*G01N 29/02* (2006.01)

(52) U.S. Cl.
CPC ... *G01N 29/022* (2013.01); *G01N 2291/0256* (2013.01); *G01N 2291/0426* (2013.01)

(58) Field of Classification Search
CPC ......... G01N 29/022; G01N 2291/0256; G01N 2291/0426; B06B 1/0622; G01H 13/00
See application file for complete search history.

(56) References Cited

U.S. PATENT DOCUMENTS

| | | | |
|---|---|---|---|
| 4,117,074 A * | 9/1978 | Tiersten | B06B 1/0629 310/334 |
| 4,412,316 A * | 10/1983 | Diepers | B06B 1/0629 367/122 |
| 4,550,606 A * | 11/1985 | Drost | G01N 29/262 367/105 |
| 4,596,697 A * | 6/1986 | Ballato | G01N 29/036 331/49 |
| 2016/0157826 A1* | 6/2016 | Sisodia | B06B 1/0622 600/454 |
| 2020/0191643 A1* | 6/2020 | Davis | G01H 1/00 |

\* cited by examiner

*Primary Examiner* — Francis C Gray
(74) *Attorney, Agent, or Firm* — Harrington & Smith

(57) ABSTRACT

Examples of the disclosure relate to a transducer array. The transducer array includes a monolithic crystal, a first array of electrodes provided on a first surface of the monolithic crystal, and a second array of electrodes provided on a second surface of the monolithic crystal. The second surface is an opposing surface to the first surface. The transducer array also comprises a plurality of oscillators wherein the plurality of oscillators include sections of the monolithic crystal that are positioned between opposing portions of an electrode from the first array and portions of an electrode from the second array.

14 Claims, 3 Drawing Sheets

TRANSDUCER ARRAY

TECHNOLOGICAL FIELD

Examples of the present disclosure relate to a transducer array. Some relate to a transducer array that can be coupled to a plurality of sensors to enable parameters to be detected and/or identified.

BACKGROUND

Transducer arrays for converting an input signal from a sensor into an electrical output signal for processing are known. In apparatus where a plurality of sensors are configured to sense one or more parameters it can be useful to configure the transducer array to enable a plurality of transducers to be provided within the array.

BRIEF SUMMARY

According to various, but not necessarily all, examples of the disclosure there is provided a transducer array comprising: a monolithic crystal; a first array of electrodes provided on a first surface of the monolithic crystal; a second array of electrodes provided on a second surface of the monolithic crystal wherein the second surface is an opposing surface to the first surface; and a plurality of oscillators wherein the plurality of oscillators comprise sections of the monolithic crystal that are positioned between opposing portions of an electrode from the first array and portions of an electrode from the second array.

The electrodes within the first array and the second array may comprise elongate electrodes.

The elongate electrodes within the second array may be configured to cross over the elongate electrodes in the first array.

The elongate electrodes may comprise one or more contact pads and the contact pads are located at locations where the elongate electrodes in the second array cross over the elongate electrodes in the first array.

The monolithic crystal may comprise quartz.

The oscillators may be sensitive to mass so that the frequency of oscillation of the oscillators provides an indication of mass accumulated on the electrodes.

The transducer array may comprise one or more sensors coupled to the electrodes.

The sensors may comprise genetically modified sensors configured to sense one or more chemicals.

The sensors may comprise chemical modification of a surface of one or more electrodes.

The transducer array may be configured to enable the oscillators to be activated individually.

The transducer array may be configured to enable the oscillators to be activated in a sequence so that oscillators within a given distance of each other are not activated simultaneously.

The transducer array may be configured to enable the oscillators to be activated in a sequence so that a first subset of oscillators can be activated at the same time while a second subset of oscillators are not activated.

The transducer array may be configured to provide an output to an artificial intelligence module.

According to various, but not necessarily all, examples of the disclosure there is provided a system comprising: a transducer array as claimed in any preceding claim; a plurality of sensors coupled to the transducer array so that the frequency of oscillation of the oscillators is dependent upon one or more chemicals sensed by the plurality of sensors; an artificial intelligence module configured to receive an electrical output signal from the transducer array.

The artificial intelligence module may use artificial intelligence to classify the electrical output signal of the transducer array by determining any one or more of: an identity of a chemical, a class of chemicals, concentration of a chemical.

BRIEF DESCRIPTION

Some examples will now be described with reference to the accompanying drawings in which.

DETAILED DESCRIPTION

Examples of the disclosure relate to a transducer array 101 and systems comprising a transducer array 101. The transducer array 101 can be configured to transduce inputs from one or more sensors into an identifiable electrical output signal. This can enable parameters such as chemicals to be sensed and identified.

Figure 1:
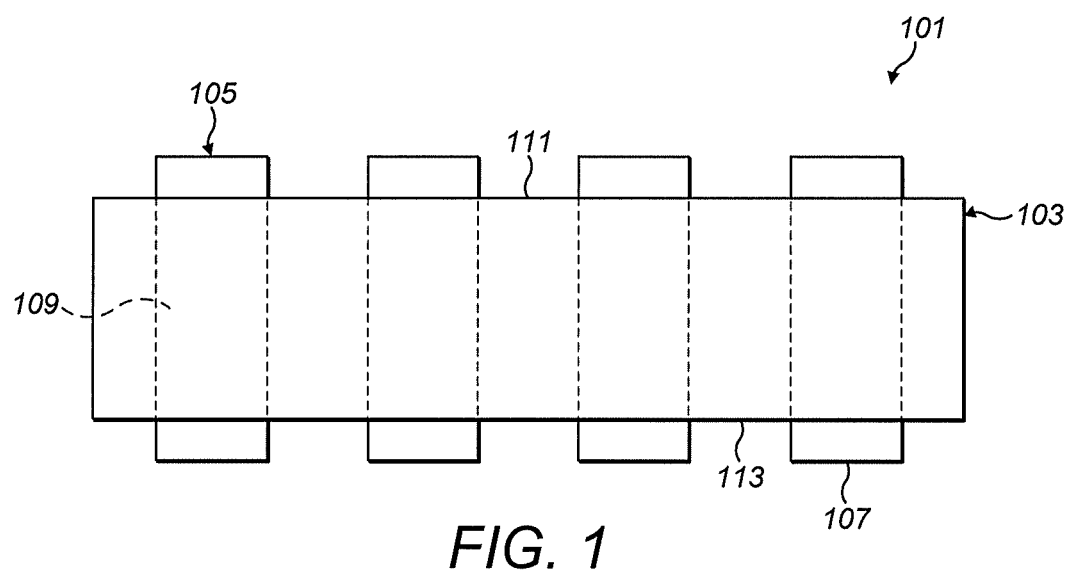
FIG. 1 illustrates a transducer array.

FIG. 1 schematically illustrates a side view of a transducer array 101. The transducer array 101 comprises a monolithic crystal 103, a first array of electrodes 105, a second array of electrodes 107 and a plurality of oscillators 109.

The monolithic crystal 103 comprises a single crystal. The monolithic crystal 103 can be configured with a first surface 111 and a second surface 113. The first surface 111 and the second surface 113 can be flat, or substantially flat, surfaces. The first surface 111 and the second surface 113 can be opposing surfaces that are positioned on opposite sides of the monolithic crystal 103. The first surface 111 and the second surface 113 can be parallel surfaces, or substantially parallel surfaces.

The monolithic crystal 103 can be any suitable size. In some examples the monolithic crystal 103 can have a dimensions of the order of 10 mm for the widths of the surface of the monolithic crystal 103. Other sizes of monolithic crystal 103 could be used in other examples of the disclosure.

The monolithic crystal 103 can comprise quartz or any other suitable type of material.

The first array of electrodes 105 are provided on a first surface 111 of the monolithic crystal 103. The second array of electrodes 107 are provided on a second surface 113 of the monolithic crystal 103.

The electrodes within the arrays 105, 107 can comprise any suitable conductive material. The material used for the electrodes can also be selected so that sensors can be coupled to electrodes.

The electrodes in the arrays 105, 107 can have any suitable shape and configuration. In some examples the electrodes can comprise elongate electrodes that extend across the respective surfaces 111, 113 of the monolithic crystal 103. The electrodes in the first array 105 can extend towards a first direction and the electrodes in the second array 107 can extend towards a second direction where the second direction is not parallel to the first direction. This ensures that the electrodes within the respective arrays 105, 107 cross over each other at a plurality of intersecting points.

The electrodes in the second array 107 could extend in a direction that is perpendicular to, or substantially perpendicular to, the electrodes in the first array 105.

The arrays of electrodes 105, 107 are positioned on the monolithic crystal 103 so that the electrodes in the first array 105 are positioned, at least partially, overlaying the electrodes in the second array 107. This enables a plurality of oscillators 109 to be formed. The plurality of oscillators 109 comprise sections of the monolithic crystal 103 that are positioned between opposing portions of an electrode from the first array 105 and portions of an electrode from the second array 107. The oscillators 109 are formed from the portions of the monolithic crystal 105 that are perpendicular to the opposing portions of the electrode. As shown in FIG. 1 the oscillators 109 extend in a perpendicular direction between the first surface 111 and the second surface 113.

The electrodes and the plurality of oscillators 109 provide a plurality of transducers. The oscillators 109 are sensitive to mass so that the resonant frequency of an oscillator 109 will be changed by any mass that is absorbed by the electrodes on either side of the oscillator 109. The resonant frequency of the oscillator 109 can then be measured to provide an indication of any mass accumulated on the electrodes. The transducers therefore transduce a detected mass into an identifiable electrical output signal.

In some examples one or more sensors can be coupled to the electrodes in the arrays 105, 107. The sensors can be configured to sense parameters such as chemicals. The parameters sensed by the sensors will affect the resonant frequencies of the oscillators 109 provided between the portions of the electrodes. This change in frequency can be detected by addressing the pairs of electrodes that are coupled to the oscillators 109 to activate the oscillator 109. The change in resonant frequency provides an indication of the parameters sensed by the sensors. This therefore enables the transducer array 101 to transduce the sensed chemicals into an identifiable electrical output signal and so enable one or more chemicals to be detected.

Figure 2A:
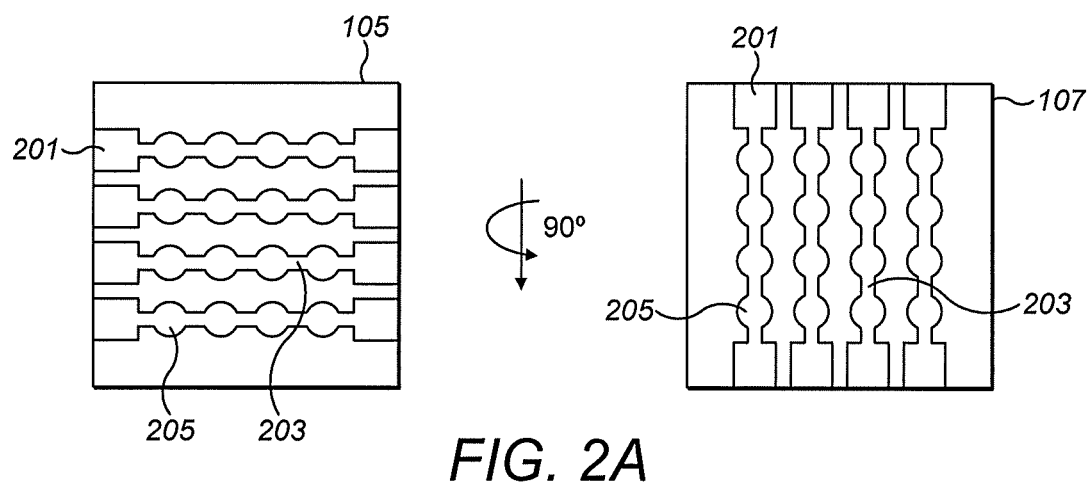
FIGS. 2A to 2D illustrate components of a transducer array.
Figure 2B:
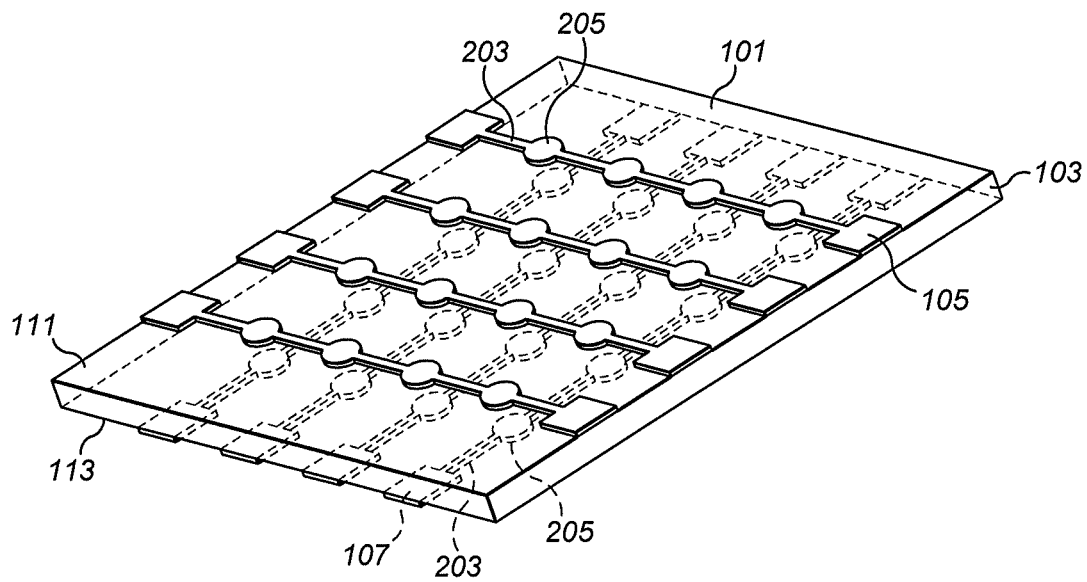
Figure 2C:
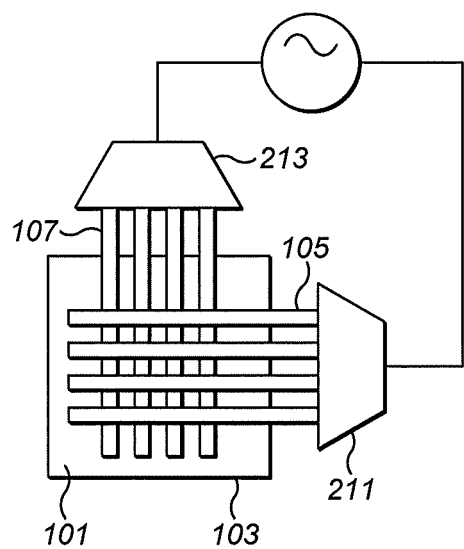

FIGS. 2A to 2C illustrate components of an example transducer array 101. The example transducer array 101 comprises a monolithic crystal 103, a first array of electrodes 105, a second array of electrodes 107 and a plurality of oscillators 109.

FIG. 2A shows example photomasks 201 that can be used to fabricate the arrays of electrodes 105, 107. In the example of FIG. 2A the electrodes within the first array 105 and the second array 107 comprise elongate electrodes 203.

In these examples the elongate electrodes 203 in each array 105, 107 are substantially parallel to each other so that the electrodes 203 within an array 105, 107 extend towards the same direction. The electrodes 203 in the second array 107 extend in a direction that is perpendicular, or substantially perpendicular to the electrodes in the first array 105. This enables a matrix of cross over points to be provided when the two arrays 105, 107 of electrodes 203 are added to monolithic crystal 103. In the example shown in FIG. 2A the electrodes 203 in the first array 105 extend in a horizontal direction while the electrodes 203 in the second array 107 extend in a vertical direction. It is to be appreciated that other orientations and configurations for the electrodes 203 could be used in other examples of the disclosure.

In the example shown in FIG. 2A the elongate electrodes 203 comprise one or more contact pads 205. In the example shown in FIG. 2A the contact pads 205 comprise a plurality of circular portions provided along the length of the elongate electrodes 203. The contact pads 205 can be provided at the cross over points of the elongate electrodes 203. It is to be appreciated that other shapes and configurations could be used for the contact pads 205 in other examples of the disclosure.

In the example shown in FIG. 2A the arrays of electrodes 105, 107 each comprise four electrodes 203 with four contact pads 205 provided along the length of each of the electrodes 203. It is to be appreciated that other numbers of electrodes 203 and contact pads 205 could be provided in other examples of the disclosure.

The electrode arrays 105, 107 and electrodes 203 within the arrays 105, 107 can have any suitable dimensions. For example, the contact pads 205 could have a diameter between 0.01 mm to 5 mm and could be spaced by between 0.01 mm to 10 mm.

Different ranges could be used in other examples of the disclosure. For instance, in some examples the arrays of electrodes 105, 107 could be designed on a nanometre scale. This could enable a large number of electrodes 203 to be provided within each of the arrays of electrodes 105, 107 and so could provide a large number of transducers within the transducer array 101.

FIG. 2B shows a three-dimensional view of the first array of electrodes 105 and the second array of electrodes 107 coupled to the monolithic crystal 103. The first array of electrodes 105 is provided on the top surface 111 of the monolithic crystal 103 and the second array of electrodes 107 is provided on the bottom surface 113 of the monolithic crystal 103. In this example the electrodes 203 within the first array of electrodes 105 are arranged to extend in a perpendicular direction to the electrodes 203 within the second array of electrodes 107. Other arrangements of the electrodes 203 can be used in other examples of the disclosure.

The arrays of electrodes 105, 107 are arranged so that the contact pads 205 of the electrodes 203 are aligned with corresponding contact pads 205 of the electrodes 203 in the opposing array 105, 107. This enables an oscillator 109 to be created within the monolithic crystal 103 between the contact pads 205 on the opposing surfaces 111, 113. The contact pads 205 provide an increased surface area of the electrodes 203 within the region of the cross over points. This enables a larger portion of the monolithic crystal 103 to be used as an oscillator 109. This also provides a larger surface area that can be used as a sensing area and can enable a larger number of sensors to be provided on the electrodes 203.

FIG. 2C illustrates the electrode arrays 105, 107 coupled to the monolithic crystal 103 and configured to create a transducer array 101. In this example the first array of electrodes 105 is provided on the top surface 111 of the monolithic crystal 103 and the second array of electrodes 107 is provided on the bottom surface 113 of the monolithic crystal 103. The first array of electrodes 105 extend in a horizontal direction and the second array of electrodes 107 extend in a vertical direction.

In the example of FIG. 2C each of the arrays of electrodes 105, 107 comprises four electrodes 203. This creates sixteen cross over points arranged in a 4×4 matrix. The cross over points of the electrodes 203 enable oscillators 109 to be created within the monolithic crystal 103 as described above and so provide a transducer array 101.

In the example shown in FIG. 2C A first multiplexer 211 is coupled to the electrodes 203 in the first array 105 and a second multiplexer 213 is coupled to the electrodes 203 in the second array 107. The multiplexers 211, 213 can be configured to enable the electrodes 203 within the arrays 105, 107 to be addressed individually so that a signal can be provided to a first electrode 203 within an array 105, 107 without providing a signal to other electrodes 203 within the same array 105, 107.

Figure 2D:
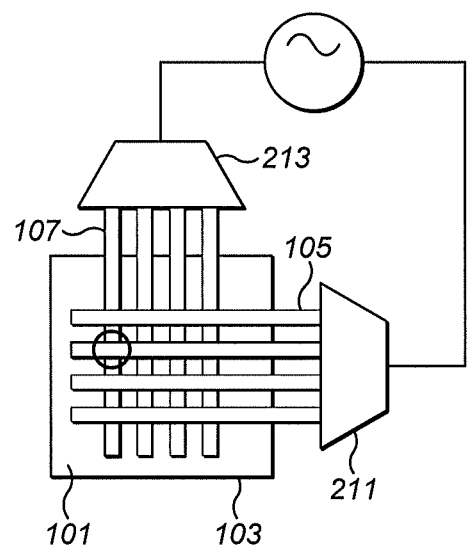

FIG. 2D shows the transducer array 101 of FIG. 2C being used to measure the resonant frequency of one of the oscillators 109. In the example shown in FIG. 2D a signal is provided to the first electrode 203 on the left hand side in the first array 105 and to the second electrode 203 from the top in the second array 107. This enables the oscillator 109 in the second row of the first column to be activated as so enables the resonant frequency of the oscillator 109 to be measured. The output signal from the transducer array 101 will provide an indication of the resonant frequency of the oscillator 109 and so will provide an indication of whether or not any mass has been accumulated on the electrodes 203 that have been activated.

In the example shown in FIG. 2D the transducer array 101 is configured to enable the oscillators 109 to be activated individually by addressing the electrodes 203 within the arrays 105, 107 individually. This reduces cross talk between oscillators 109 as only one oscillator 109 is activated at a given time.

In some examples the transducer array 101 can be configured to enable the oscillators 109 to be activated in a sequence so that oscillators 109 within a given distance of each other are not activated simultaneously. The given distance can ensure that there is no cross talk between the oscillators 109 that affects the measurements of the resonant frequencies. The size of the distance that is necessary to avoid the cross talk will depend on the size of the contact pads 205 within the electrodes 203 and the spacing between the electrodes 203.

In some examples the transducer array 101 can be configured to enable the oscillators 109 to be activated in a sequence so that a first subset of oscillators 109 can be activated at the same time while a second subset of oscillators 109 are not activated. For example, two or more oscillators 109 that are separated by more than a minimum distance can be activated simultaneously while any oscillators 109 within the minimum distance could remain deactivated so as to avoid cross talk.

Figure 3:
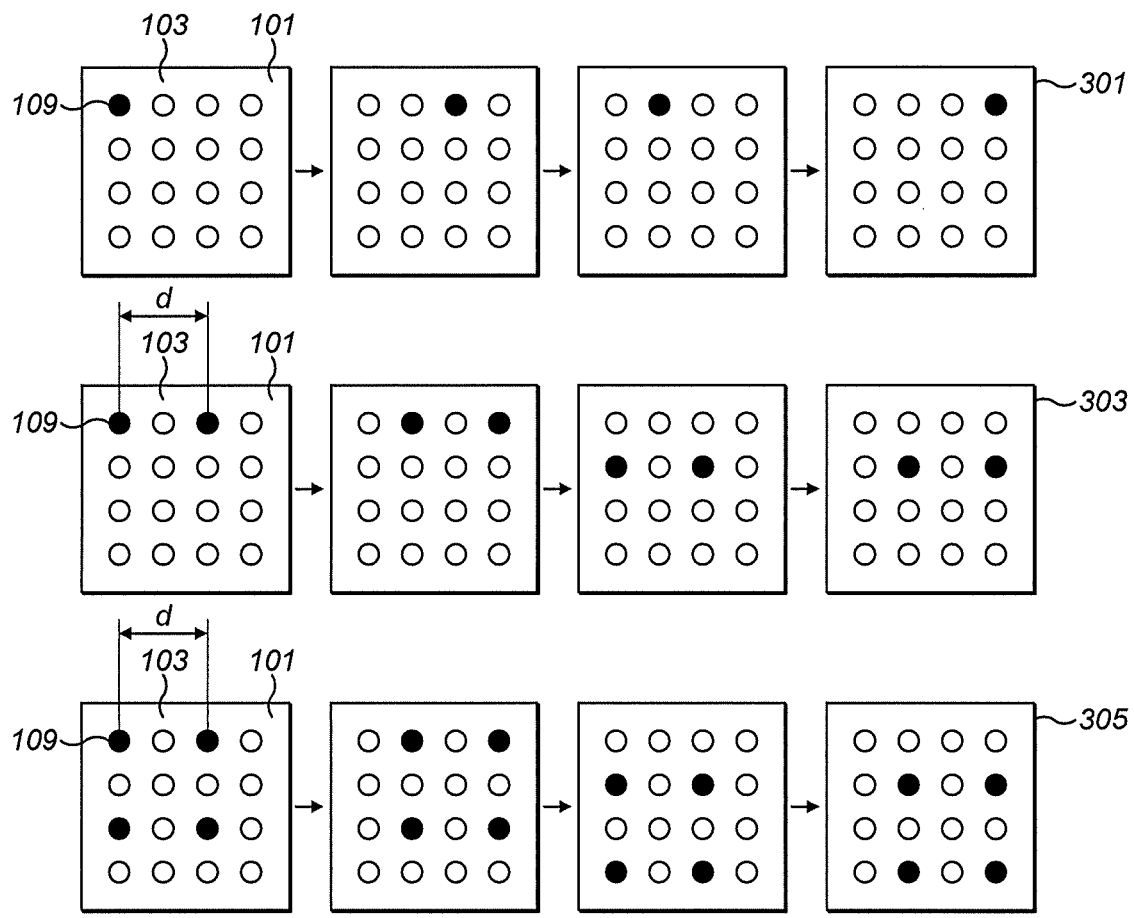
FIG. 3 illustrates addressing sequences for a transducer array.

FIG. 3 illustrates a plurality of different addressing sequences 301, 303, 305 for an example transducer array 101. The addressing sequences 301, 303, 305 are designed to reduce cross talk between measurements from the oscillators 109 by ensuring that oscillators 109 are activated in a sequence that ensures that there is at least a minimum distance d between oscillators 109 that are activated at the same time. In some examples the addressing sequences 301, 303, 305 avoid addressing oscillators 109 within a minimum distance consecutively as the damping of the oscillations would not be instantaneous and so could lead to cross talk.

In the addressing sequences shown in FIG. 3 the transducer array 101 comprises a plurality of transducers where each transducer comprises an oscillator 109 formed from the portion of a monolithic crystal 103 positioned between portions of two electrodes 203 as described above. In the example of FIG. 3 the transducers are arranged in a 4×4 matrix comprising four rows and row columns. This could be formed using the example electrode arrays 105, 107 as shown in FIGS. 2A to 2D. It is to be appreciated that in other examples the transducer array 101 could comprise a different number of transducers arranged in a different configuration.

In the first addressing sequence 301 a single oscillator 109 is activated at a single time. When the single oscillator 109 is activated all of the other oscillators 109 in the transducer array 101 remain deactivated.

In the first example sequence 301 the first electrode 203 in the first row of the first array of electrodes 105 is addressed so as to enable any oscillator 109 in the first row to be activated. None of the other electrodes 203 in the first array 105 are selected so that none of the oscillators 109 in the other rows can be activated.

The electrodes 203 in the second array of electrodes 107 are addressed in an alternating sequence so that the electrodes 203 in the odd columns are addressed in a sequence before the electrodes 203 in the even columns are addressed. This ensures that adjacent oscillators 109 are not activated consecutively and so avoids cross talk between adjacent oscillators 109.

Once all of the oscillators 109 in the first row have been activated the next electrode 203 in the first array of electrodes 105 can be addressed so as to enable the pattern to be repeated for another row. The next electrode 203 could be the electrode 203 in the second row or could be in another row that is spaced further apart from the electrode 203 that has just been addressed.

In the second addressing sequence 303 a plurality of oscillators 109 are activated at the same time. The plurality of oscillators 109 form a subset of the available oscillators 109 so that at least some of the oscillators 109 are not activated.

The oscillators 109 that are activated at the same time are separated by a minimum distance d. The minimum distance d can be determined by the size of the electrodes 203 or the contact pads 205 of the electrodes 203 and the separation between the electrodes 203 and contact pads 205. In the example shown in FIG. 3 the oscillators 109 that are activated at the same time are not adjacent to each other so that there is at least one oscillator 109 that is not activated between the oscillators 109 that are activated. In other examples the spacing between the oscillators 109 could be sufficient to enable adjacent oscillators 109 to be activated without inducing cross talk.

In the second addressing sequence 303 as shown in FIG. 3 the first electrode 203 in the first row of the first array of electrodes 105 is addressed so as to enable any oscillator 109 in the first row to be activated. None of the other electrodes 203 in the first array 105 are selected so that none of the oscillators 109 in the other rows can be activated.

The electrodes 203 in the second array of electrodes 107 are addressed in pairs so that two oscillators 109 can be activated simultaneously. In the example shown in FIG. 3 both of the electrodes 203 in the odd columns are addressed at the same time before both of the electrodes 203 in the even columns are then addressed at a later time. This ensures that adjacent oscillators 109 are not activated consecutively and so avoids cross talk between adjacent oscillators 109.

Once the all of the oscillators 109 in the first row have been activated the second electrode 203 in the second row of the first array of electrodes 105 is addressed to enable any oscillator 109 in the first row to be activated. The addressing of the electrodes in the second array of electrodes 107 can then be repeated for the second row.

The third addressing sequence 305 also shows a plurality of oscillators 109 being activated at a single time. The activated plurality of oscillators 109 form a subset of the available oscillators 109 so that at least some of the oscillators 109 are not activated.

In the third addressing sequence 305 two oscillators 109 within the same row and two oscillators 109 within the same column are activated at the same time. The oscillators 109 that are activated at the same time are separated by a minimum distance d. The minimum distance can be determined by the size of the electrodes and the separation between the electrodes. In the example shown in FIG. 3 the oscillators 109 that are activated at the same time are not adjacent to each other so that there is at least one oscillator 109 that is not activated between the oscillators 109 that are activated. In other examples the spacing between the oscillators 109 could be sufficient to enable adjacent oscillators 109 to be activated without inducing cross talk.

In the third addressing sequence 305 as shown in FIG. 3 the electrodes 203 in the odd rows of the first array of electrodes 105 is addressed so as to enable any oscillator 109 in the odd rows to be activated. None of the other electrodes 203 in the first array 105 are selected so that none of the oscillators 109 in the other rows can be activated.

The electrodes 203 in the second array of electrodes 107 are addressed in pairs so that four oscillators 109 can be activated simultaneously. In the example shown in FIG. 3 both of the electrodes 203 in the odd columns are addressed at the same time before both of the electrodes 203 in the even columns are then addressed at a later time. This ensures that adjacent oscillators 109 are not activated consecutively and so avoids cross talk between adjacent oscillators 109.

Once the all of the oscillators 109 in the odd rows have been activated the electrodes 203 in the even row of the first array of electrodes 105 are addressed to enable any oscillator 109 in the even rows to be activated. The addressing of the electrodes in the second array of electrodes 107 can then be repeated for the even rows.

In addressing sequences where two or more oscillators 109 are activated together the oscillators 109 that are activated together can be provided between electrodes 203 or contact pads 205 that have identical surface properties. That is, the contact pads 205 and/or electrodes 203 can be the same size and shape and formed from the same material. The two or more oscillators 109 that are activated at the same time can form an oscillator group. Signals from the individual oscillators 109 within the oscillator group can be integrated to provide a single output signal from the oscillator group. This can improve signal-to-noise ration within the transducer array.

It is to be appreciated that other addressing sequences could be used in other examples of the disclosure.

Figure 4:
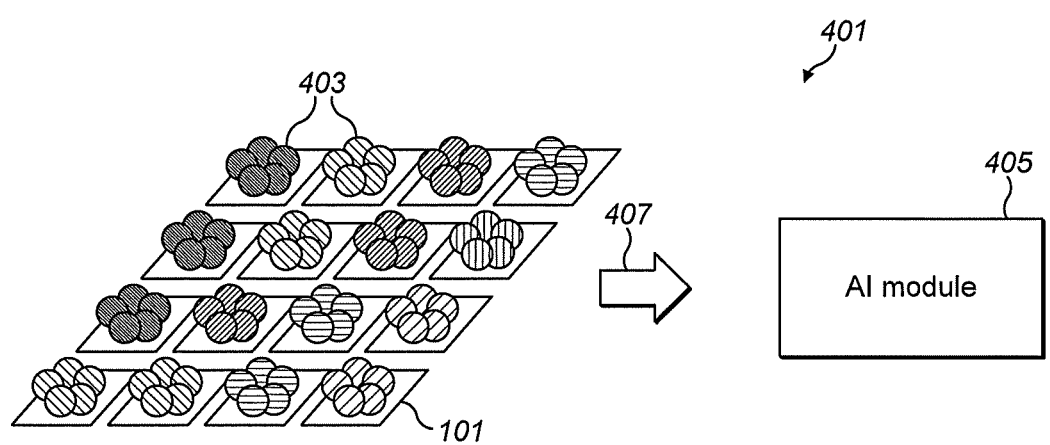
FIG. 4 illustrates a system comprising a transducer array.

FIG. 4 schematically illustrates a system 401 comprising a transducer array 101, a plurality of sensors 403 and an artificial intelligence module 405. The system 401 shown in FIG. 401 can be used to sense parameters such as chemicals. This could be used as an artificial nose or other similar application. It is to be appreciated that the transducer array 101 could also be used in other types of systems.

The transducer array 101 can be as described above. Corresponding reference numerals are used for corresponding features. In the example shown the transducer array 101 comprises sixteen pixels where each pixel comprises an oscillator 109 formed from a portion of monolithic crystal 103 between the cross over points of two electrodes 203.

A plurality of sensors 403 are coupled to the transducer array 101 so that the frequency of oscillation of the oscillators 109 is dependent upon one or more chemicals sensed by the plurality of sensors 403.

The sensors 403 can be coupled to the contact pads 205, or any other suitable portion, of the electrodes 203. The sensors 403 are coupled to contact pads 205 so that the output signal provided by the oscillator 109 is dependent upon whether or not the sensors 403 have sensed a chemical.

In some examples plurality of sensors 403 could comprise genetically modified sensors. The genetically modified sensors 403 could comprise at least one of viral particles, desiccation tolerant cells, synthetic peptides, randomized DNA, proteins and receptors or any other suitable biological material. The genetically modified sensors 403 can be modified to sense chemicals in a gas phase and/or a liquid phase.

The genetically modified sensors 403 may be adsorbed to the contact pads 205 of the electrodes 203. The adsorption could be chemical adsorption or physical adsorption. The chemical bond formed in a chemical adsorption process could be a covalent bond, a partially covalent bond or any other suitable type of bond. The type of coupling that is used to couple sensors 403 to the contact pads 205 would be dependent upon the types of sensors 403 that are used and the materials used for the electrodes 203 and contact pads 205.

In other examples the plurality of sensors 403 can comprise chemical modification of the surface of the contact pads 205 and/or electrodes 203. The chemical modification could comprise a chemical coating such as a polymer provided on the surface of the contact pad 205 and/or electrode 203. The chemical coating could be configured to enable chemicals to be accumulated on the surface of the contact pad 205.

The artificial intelligence module 405 is coupled to the transducer array 101 and configured to receive an electrical output signal from the transducer array 101.

The output provided by each of the pixels within the transducer array 101 is dependent upon the chemicals that are sensed by the sensors 403 coupled to the pixels. The transducer array 101 therefore provides an electrical output signal that is dependent upon one or more chemicals being sensed by the plurality of sensors 403. Different pixels can have different types of sensors 403 coupled to them so that different pixels provide different electrical output signals. The different electrical output signals from the pixels within the transducer array 101 can be combined so as to provide an identifiable electrical output signal 407.

The identifiable electrical output signal 407 comprises information that enable one or more chemicals or types of chemicals to be identified. The identifiable electrical output signal 407 can comprise information that enables a plurality of different chemicals to be identified. In some examples the identifiable electrical output signal 407 can comprise information that enables a concentration of the chemicals or types of chemicals to be determined. The chemicals can comprise any suitable types of chemicals including bio-chemicals.

The identifiable electrical output signal 407 from the transducer array 101 is provided to the artificial intelligence module 405 so as to enable the identifiable electrical output signal 407 to be classified. The artificial intelligence module 405 can be configured to use a pattern recognition algorithm, or any other suitable type of algorithm, to classify the identifiable electrical output signal 407. Classifying the electrical output signal 407 comprises one or more of: determining an identity of a chemical, determining a class of chemicals, determining concentration of a chemical.

The artificial intelligence module may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering.

Artificial neural networks, for example with one or more hidden layers, model complex relationship between input vectors and output vectors. Support vector machines may be used for supervised learning. A Bayesian network is a directed acyclic graph that represents the conditional independence of a number of random variables.

Examples of the disclosure therefore provide a transducer array 101 that can enable a large number of transducers to be provided on a single monolithic crystal 103. The transducer array 101 can be fabricated to small sizes so as to enable small amounts of a parameters to be detected.

In some examples the transducer array 101 can be configured to reduce cross talk between oscillators 109, this can enable a larger number of oscillators 109 to be provided in a smaller area. This can be achieved through the use of addressing sequences as described above and appropriate sizing and spacing of the electrodes 203.

In this description the term coupled means operationally coupled. Any number or combination of intervening elements can exist between coupled components, including no intervening elements.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. A transducer array comprising:
    a monolithic crystal;
    a first array of electrodes provided on a first surface of the monolithic crystal;
    a second array of electrodes provided on a second surface of the monolithic crystal wherein the second surface is an opposing surface to the first surface; and
    a plurality of oscillators wherein the plurality of oscillators comprise sections of the monolithic crystal that are positioned between opposing portions of an electrode from the first array and portions of an electrode from the second array;
    wherein the transducer array is configured to enable the oscillators to be activated in a sequence so that oscillators within a given distance of each other are not activated simultaneously.

2. A transducer array as claimed in claim 1 wherein the electrodes within the first array and the second array comprise elongate electrodes.

3. A transducer array as claimed in claim 2 wherein the elongate electrodes within the second array are configured to cross over the elongate electrodes in the first array.

4. A transducer array as claimed in claim 3 wherein the elongate electrodes comprise one or more contact pads and the contact pads are located at locations where the elongate electrodes in the second array cross over the elongate electrodes in the first array.

5. A transducer array as claimed in claim 1 wherein the monolithic crystal comprises quartz.

6. A transducer array as claimed in claim wherein the oscillators are sensitive to mass so that the frequency of oscillation of the oscillators provides an indication of mass accumulated on the electrodes.

7. A transducer array as claimed in claim 1 comprising one or more sensors coupled to the electrodes.

8. A transducer array as claimed in claim 7 wherein the sensors comprise genetically modified sensors configured to sense one or more chemicals.

9. A transducer array as claimed in claim 7 wherein the sensors comprise chemical modification of a surface of one or more electrodes.

10. A transducer array as claimed in claim wherein the transducer array is configured to enable the oscillators to be activated individually.

11. A transducer array as claimed in claim wherein the transducer array is configured to enable the oscillators to be activated in a sequence so that a first subset of oscillators can be activated at the same time while a second subset of oscillators are not activated.

12. A transducer array as claimed in claim 1 wherein the transducer array is configured to provide an output to an artificial intelligence module.

13. A system comprising:

a transducer array as claimed in claim 1;

a plurality of sensors coupled to the transducer array so that the frequency of oscillation of the oscillators is dependent upon one or more chemicals sensed by the plurality of sensors;

an artificial intelligence module configured to receive an electrical output signal from the transducer array.

14. A system as claimed in claim 13 wherein the artificial intelligence module uses artificial intelligence to classify the electrical output signal of the transducer array by determining any one or more of: an identity of a chemical, a class of chemicals, concentration of a chemical.

\* \* \* \* \*

UNITED STATES PATENT AND TRADEMARK OFFICE
CERTIFICATE OF CORRECTION

| | | |
|---|---|---|
| PATENT NO. | : 11,525,807 B2 | |
| APPLICATION NO. | : 17/320356 | |
| DATED | : December 13, 2022 | |
| INVENTOR(S) | : John Kim | |

It is certified that error appears in the above-identified patent and that said Letters Patent is hereby corrected as shown below:

In the Claims

In Claim 6: Column 11, Line 1, after the word "claim" insert --1--

In Claim 10: Column 11, Line 13, after the word "claim" insert --1--

In Claim 11: Column 11, Line 16, after the word "claim" insert --1--

Signed and Sealed this
Thirty-first Day of January, 2023

Katherine Kelly Vidal
*Director of the United States Patent and Trademark Office*